United States Patent
Sarkisian et al.

(10) Patent No.: US 6,276,166 B1
(45) Date of Patent: Aug. 21, 2001

(54) AUXILIARY THERMAL STORAGE HEATING AND AIR CONDITIONING SYSTEM FOR A MOTOR VEHICLE

(75) Inventors: Paul Sarkisian; Uwe Rockenfeller, both of Boulder City, NV (US); Lance Kirol, Wolcott, VT (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/357,696

(22) Filed: Jul. 20, 1999

(51) Int. Cl.⁷ ....................................................... F25B 17/08
(52) U.S. Cl. .............................. 62/480; 62/238.3; 62/476; 62/112
(58) Field of Search .................................. 62/238.3, 476, 62/112, 480

(56) References Cited

U.S. PATENT DOCUMENTS

| | | |
|---|---|---|
| Re. 34,259 | 5/1993 | Rockenfeller et al. . |
| 2,241,600 | 5/1941 | Hunsicker . |
| 2,537,720 | 1/1951 | Wagner . |
| 4,292,265 | 9/1981 | Ron et al. . |
| 4,507,263 | 3/1985 | Ron . |
| 4,538,424 * | 9/1985 | Meyers .................................... 62/236 |
| 4,623,018 | 11/1986 | Tekeshita et al. . |
| 4,906,258 | 3/1990 | Balat et al. . |
| 5,161,389 | 11/1992 | Rockenfeller et al. . |
| 5,186,020 | 2/1993 | Rockenfeller et al. . |
| 5,231,849 * | 8/1993 | Rosenblatt ......................... 62/238.3 |
| 5,271,239 | 12/1993 | Rockenfeller et al. . |
| 5,283,219 | 2/1994 | Mauran et al. . |
| 5,298,231 | 3/1994 | Rockenfeller . |
| 5,328,671 | 7/1994 | Rockenfeller . |
| 5,333,471 * | 8/1994 | Yamada ................................. 62/476 |
| 5,359,864 * | 11/1994 | Yamada ................................. 62/480 |
| 5,383,341 * | 1/1995 | Zur et al. ............................... 62/476 |
| 5,384,101 | 1/1995 | Rockenfeller . |
| 5,388,423 * | 2/1995 | Khelifa ............................... 62/238.3 |
| 5,440,899 | 8/1995 | De Beijer et al. . |
| 5,441,716 | 8/1995 | Rockenfeller . |
| 5,535,602 * | 7/1996 | Eun et al. .............................. 62/489 |
| 5,537,837 * | 7/1996 | Hsieh ................................. 62/238.3 |
| 5,857,354 * | 1/1999 | Ishiguro ................................. 62/476 |
| 5,896,747 * | 4/1999 | Antohi ................................... 62/101 |
| 5,901,572 | 5/1999 | Peiffer et al. . |

FOREIGN PATENT DOCUMENTS

| | | |
|---|---|---|
| 40 41 626 C1 | 4/1992 | (DE) . |
| 2 704 485 A1 | 11/1994 | (FR) . |

* cited by examiner

*Primary Examiner*—William Doerrler
*Assistant Examiner*—Mark Shulman
(74) *Attorney, Agent, or Firm*—Knobbe, Martens, Olson & Bear, LLP

(57) ABSTRACT

An auxiliary thermal storage heating and air conditioning system having an output for selectively delivering warm and cool air to the passenger area of a motor vehicle incorporates a reactor containing a metal salt or a complex compound formed by absorbing a polar gas refrigerant on a metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide. In a preferred embodiment, the reactor contains a sorbent/substrate composition comprising a substrate material inert to the polar gas and incorporating the salt or the complex compound. One embodiment utilizes apparatus having a heat exchanger which selectively functions as an evaporator for a cooling mode and a condenser for a heating mode, and inside and outside coils for transferring system generated thermal energy. Another embodiment of the system uses a refrigerant circulatory system having a circuitous refrigerant line and an evaporator and condenser serially disposed within the circuitous line and a multi-channel ventilation system having a blower for forcing air through the channels of the system and to the output, the channels communicating with the evaporator, the condenser, and the reactor.

113 Claims, 4 Drawing Sheets

AUXILIARY THERMAL STORAGE HEATING AND AIR CONDITIONING SYSTEM FOR A MOTOR VEHICLE

BACKGROUND OF THE INVENTION

In U.S. Pat. No. 5,901,572 there is disclosed a thermal storage system which provides heating and cooling to the passenger compartment of the vehicle for extended periods of time when the vehicle engine is not operating. The system described comprises a refrigerant circulatory system having a circuitous refrigerant line and an evaporator and condenser serially disposed within the circuitous line operative to vaporize and condense a refrigerant fluid, respectively, a reactor containing a sorbent material for absorbing vaporized refrigerant in fluid communication with the refrigerant line, a heater in thermal communication with the sorbent, and a multi-channel ventilation system having a blower for forcing air through the channels of the system and to the output, said channels communicating with the evaporator, the condenser, and the reactor. The thermal storage system and method of operation disclosed in the aforesaid U.S. Pat. No. 5,901,572 is incorporated herein by reference.

SUMMARY OF THE INVENTION

The improved auxiliary heating and air conditioning system of the present invention comprises the thermal storage system described in the aforesaid patent utilizing a solid-vapor sorption reactor containing a complex compound formed by adsorbing a polar gas, preferably ammonia, on a metal salt. In a preferred embodiment, the reactor contains a substrate material incorporating the metal salt or the complex compound. Complex compounds incorporating ammonia are capable of absorbing large amounts of the refrigerant, as well as having high reaction rates. By using a sorbent/substrate composition as disclosed hereinafter, the reactor of the system offers improved performance and life expectancy.

DETAILED DESCRIPTION OF THE PREFERRED EMBODIMENTS

Figure 1:
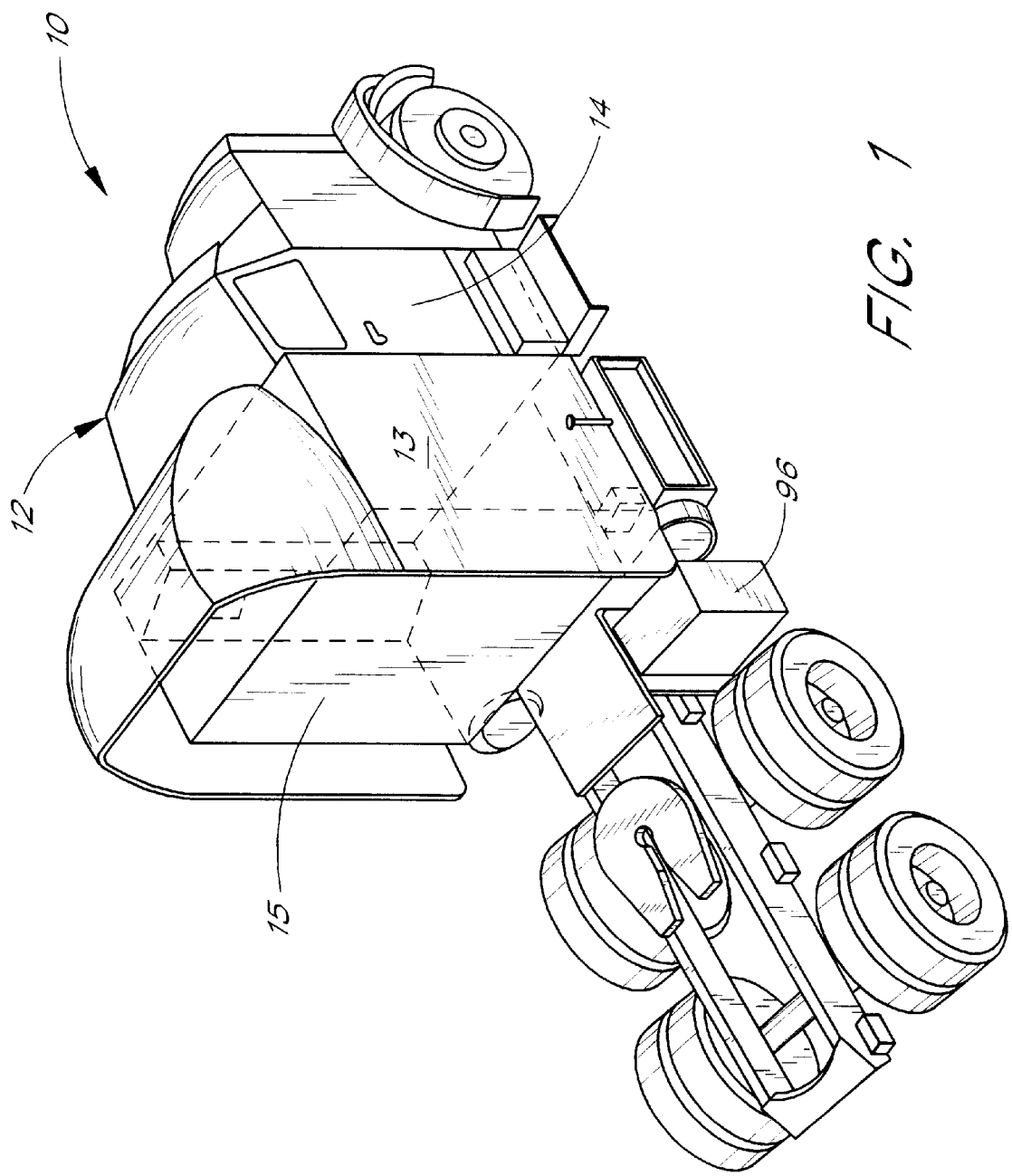
FIG. 1 is a view of a tractor of a tractor-trailer vehicle having a passenger area partitioned into cab and bunk areas.

FIG. 1 shows a tractor 10 of a tractor-trailer vehicle. The tractor portion 10 of the tractor trailer vehicle includes an interior space that defines a passenger compartment 12 which is further partitioned, as by curtain 13, into a cab area 14 and a bunk or sleeper area 15. The bunk or sleeper area can be used by the driver of the vehicle 10 for periodic rest breaks during long runs. During operation of the vehicle, the passenger compartment 12 is generally heated and cooled by a primary heating and air conditioning system that is powered by the engine (not shown) of the tractor 10. For heating, the hot engine coolant is piped to a heat exchanger in the passenger compartment. For cooling, the engine drives a rotary compressor which compresses and drives refrigerant around a conventional air conditioning circuit which has an evaporator coil in the passenger compartment. During the driver's rest breaks it is desirable to be able to shut down the engine of the tractor 10 in order to save fuel, reduce engine wear, and limit environmental pollution. Although the drawings illustrate operation of the present system in connection with the passenger compartment of a tractor-trailer vehicle, it may be used to heat and air condition the passenger compartment of any type of motor vehicle, thus, including tractor-trailer vehicles, cars, trucks, campers, motor homes, recreational vehicles, busses, certain boats, and small airplanes or any areas of a motor vehicle where the passengers may be located such as, for example, the passenger compartment of a tractor trailer vehicle, just the sleeper area of the passenger compartment of a tractor trailer vehicle, the living area of a camper, motor home, or recreational vehicle, and the living and sleeping quarters of certain boats.

In the following description, the terms absorb and absorption are used interchangeably with adsorb and adsorption to refer to the same sorption reaction between a polar gas and a metal salt to form a coordinative complex compound. The heating and air conditioning systems of the invention incorporate and utilize a solid-vapor sorption reactor containing a complex compound formed by absorbing a polar gas on a metal salt. The complex compounds are those disclosed in U.S. Pat. No. Re. 34,259 incorporated herein by reference. During the absorption reaction the volumetric expansion of the complex compound formed is restricted as described in U.S. Pat. Nos. 5,298,231, 5,328,671 and 5,441,716, the descriptions of which are incorporated herein by reference. The preferred polar gaseous reactants are ammonia, water, lower alkanols ($C_1$–$C_5$), alkylamines, and polyamines. Sulfur dioxide, pyridine and phosphine may also be used. Ammonia is most preferred. Preferred metal salts include the nitrates, nitrites, perchlorates, oxalates, sulfates, sulfites and halides, particularly chlorides, bromides and iodides of alkali metals, alkaline earth metals, transition metals, particularly chromium, manganese, iron, cobalt, nickel, copper, tantalum and rhenium, as well as zinc, cadmium, tin and aluminum. Double metal chloride or bromide salts, in which at least one of the metals is an alkali or alkaline earth metal, aluminum, chromium, copper, zinc, tin, manganese, iron, nickel or cobalt are also useful. Another salt of special interest is $NaBF_4$. Other useful complex compounds are disclosed in U.S. Pat. Nos. 5,186,020 and 5,263,330, the descriptions of which are incorporated herein by reference. Preferred complex compounds used in the reaction of the invention are the following or comprise adsorption/desorption compositions containing at least one of the following as a component. Although in the following complex compounds, numerical values of moles of ammonia ("X") per mole of salt are given, in some complexes, the mole range given comprises several coordination steps. For example, in the case of $NaBF_4$ compounds, a number of different reaction steps occur between the numerical limits given. Typically however, practical considerations only allow for use of a portion of the designed coordination range. Accordingly, the following ranges are intended to be approximate as will be understood by those skilled in the art.

| Complex Compound | X Value |
| --- | --- |
| $SrCl_2.X\ (NH_3)$ | 0-1, 1-8 |
| $CaCl_2.X\ (NH_3)$ | 0-1, 1-2, 2-4, 4-8 |
| $ZnCl_2.X\ (NH_3)$ | 0-1, 1-2, 2-4, 4-6 |

-continued

| Complex Compound | X Value |
|---|---|
| $ZnBr_2.X\ (NH_3)$ | 0-1, 1-2, 2-4, 4-6 |
| $ZnI_2.X\ (NH_3)$ | 0-1, 1-2, 2-4, 4-6 |
| $CaBr_2.X\ (NH_3)$ | 0-1, 1-2, 2-6 |
| $CoCl_2.X\ (NH_3)$ | 0-1, 1-2, 2-6 |
| $CoBr_2.X\ (NH_3)$ | 0-1, 1-2, 2-6 |
| $CoI_2.X\ (NH_3)$ | 0-2, 2-6 |
| $BaCl_2.X\ (NH_3)$ | 0-8 |
| $MgCl_2.X\ (NH_3)$ | 0-1, 1-2, 2-6 |
| $MgBr_2.X\ (NH_3)$ | 0-1, 1-2, 2-6 |
| $MgI_2.X\ (NH_3)$ | 0-2, 2-6 |
| $FeCl_2.X\ (NH_3)$ | 0-1, 1-2, 2-6 |
| $FeBr_2.X\ (NH_3)$ | 0-1, 1-2, 2-6 |
| $FeI_2.X\ (NH_3)$ | 0-2, 2-6 |
| $NiCl_2.X\ (NH_3)$ | 0-1, 1-2, 2-6 |
| $NiBr_2.X\ (NH_3)$ | 0-1, 1-2, 2-6 |
| $NiI_2.X\ (NH_3)$ | 0-2, 2-6 |
| $SrI_2.X\ (NH_3)$ | 0-1, 1-2, 2-6, 6-8 |
| $SrBr_2.X\ (NH_3)$ | 0-1, 1-2, 2-8 |
| $SnCl_2.X\ (NH_3)$ | 0-2.5, 2.5-4, 4-9 |
| $SnBr_2.X\ (NH_3)$ | 0-1, 1-2, 2-3, 3-5, 5-9 |
| $BaBr_2.X\ (NH_3)$ | 0-1, 1-2, 2-4, 4-8 |
| $MnCl_2.X\ (NH_3)$ | 0-1, 1-2, 2-6 |
| $MnBr_2.X\ (NH_3)$ | 0-1, 1-2, 2-6 |
| $MnI_2.X\ (NH_3)$ | 0-2, 2-6 |
| $CaI_2.X\ (NH_3)$ | 0-1, 1-2, 2-6, 6-8 |
| $CrCl_2.X\ (NH_3)$ | 0-3, 3-6 |
| $LiCl.X\ (NH_3)$ | 0-1, 1-2, 2-3, 3-4 |
| $LiBr.X\ (NH_3)$ | 0-1, 1-2, 2-3, 3-4 |
| $NaCl.X\ (NH_3)$ | 0-5 |
| $NaBr.X\ (NH_3)$ | 0-5.25 |
| $NaBF_4.X\ (NH_3)$ | 0.5-2.5 |
| $NaI.X\ (NH_3)$ | 0-4.5 |
| $K_2FeCl_5.X\ (NH_3)$ | 0-5, 5-6, 6-11 |
| $K_2ZnCl_4.X\ (NH_3)$ | 0-5, 5-12 |
| $Mg(ClO_4)_2.X\ (NH_3)$ | 0-6 |
| $Mg(NO_3).X\ (NH_3)$ | 0-2, 2-4, 4-6 |
| $Sr(ClO_4)_2.X\ (NH_2)$ | 0-6, 6-7 |
| $CrBr_3.X\ (NH_3)$ | 0-3 |
| $CrCl_2.X\ (NH_3)$ | 0-3, 3-6 |
| $VCl_3.X\ (NH_3)$ | 0-3, 3-5, 5-6, 6-7, 7-12 |
| $AlCl_3.X\ (NH_3)$ | 0-1, 1-3, 3-5, 5-6, 6-7, 7-14 |
| $CuSO_4.X\ (NH_3)$ | 0-1, 1-2, 2-4, 4-5 |

Especially preferred are any of the $CaCl_2.X\ (NH_3)$ complexes, $SrCl_2.1–8\ (NH_3)$, $SrBr_2.2–8\ (NH_3)$, $CaBr_2.2–6\ (NH_3)$, $CaI_2.2–6\ (NH_3)$, $FeCl_2.2–6\ (NH_3)$, $FeBr_2.2–6\ (NH_3)$, $FeI_2.2–6\ (NH_3)$, $CoCl_2.2–6\ (NH_3)$, $CoBr_2.2–6\ (NH_3)$, $BaCl_2.0–8\ (NH_3)$, $MgCl_2.2–6\ (NH_3)$, $MgBr_2.2–6\ (NH_3)$, $MnCl_2.2–6\ (NH_3)$ and $MnBr_2.2–6\ (NH_3)$, and mixtures of two or more thereof.

Preferred reactors used in the system incorporate the improvements disclosed in U.S. application Ser. No. 09/304,763 filed May 4, 1999, incorporated herein by reference. More specifically the space between heat exchange surfaces of the reactor are substantially filled with a sorbent/substrate composition comprising a substrate material that incorporates the metal salt or a complex compound produced from the metal salt and a polar gas. The substrate material incorporating the metal salt or complex compound may be a woven material such as a fabric or cloth, an unwoven material such as felt, mat or similar material in which the strands or fibers have been tangled or otherwise mixed, twisted, pressed or packed to form a coherent substrate. Woven fabric layers may be used between unwoven layers of fibers, especially in composites of alternating woven and unwoven fiber layers. Yarn, rope, or strips or ribbons of substrate fabric may also be used for certain rector heat exchanger designs.

Specific preferred substrate materials include nylon polymers including non-aromatic nylons or polyamids, aromatic polyamides or aramids, fiberglass, and polyphenylene sulfides. The aramids are preferred for complex compounds operating at reaction temperatures below about 150° C. For higher temperatures, fiberglass and polyphenylene sulfides are preferred, while at temperatures below about 120° C., nylon-based polymer materials are also suitable. Aramids are not recommended at reaction temperatures above about 150° C. Substrate materials having a high thermal conductivity are advantageous since they improve heat transfer properties of the heat exchanger sorber core. The thermal conductivity of aforesaid substrate materials may be enhanced by incorporating highly thermal-conductive materials such as fibers, particulates, etc. into the substrate.

To obtain high thermodynamic and mass efficiency of the substrate composition, it is desirable to use a physical form of the material which can be loaded with a high mass fraction of the sorbent. It is preferable that at least 50%, and preferably 70%, and most preferably 85% or more, of the volume of the sorbent/substrate composition comprises the sorbent itself. Thus, a preferred substrate material used to produce the sorbent/substrate composition of the invention has a porosity of about 50% or more and up to about 98. Examples of types of fabric used to meet such open volume and porosity requirements include textile materials such as cloth, fabric, felt, mat, etc., commonly formed by weaving or knitting, as well as non-woven but cohesive forms such as batt or batting and the like. It has been found advantageous to use a substrate material sufficiently gas permeable for the refrigerant gas to pass through and sufficiently low in pore size to prevent small salt particles to penetrate. Although woven materials usually provide superior physical and structural uniformity, the use of non-woven or amorphous fiber substrates may provide for more uniform distribution of solid sorbent throughout the pores, spaces and interstices of the material.

The sorbent is incorporated in the substrate material by embedding or impregnating or otherwise combining the two components to form the sorbent/substrate composition to be installed in a sorber heat exchanger according to the invention. The preferred method of incorporating the sorbent into the substrate material is by impregnation. Such impregnation is carried out by any suitable means such as spraying the substrate material with a liquid solution, slurry, suspension or mixture containing the sorbent or soaking the substrate in a liquid solution, slurry or suspension of the sorbent followed by removal of the solvent or carrier by drying or heating, and/or by applying a vacuum. Yet, other method for incorporating sorbent into the substrate include embedding or otherwise distributing fine sorbent particles within the substrate using blowing, blasting or sintering methods and techniques. Moreover, the particles may be directed into or combined with the substrate material at the time the substrate felt or fabric is manufactured, or subsequently. The sorbent may also be melted, for example, as a hydrate, and the liquid sorbent applied to the substrate after or during substrate manufacture. It may be preferred to impregnate the substrate with the absorbent prior to installation in the reactor. However, the substrate may also be installed prior to being impregnated with the solution containing the absorbent salt.

The mass diffusion path of the reactors is the distance a gas molecule must travel between the gas distribution surface and the absorbent particle. The specific description and definition of the mass diffusion path length is disclosed in U.S. Pat. No. 5,441,716 and is incorporated herein by reference. In reactors using ammonia as the refrigerant and ammoniated complex compounds, the mean maximum mass diffusion path is preferably below about 15 mm, which corresponds to the preferred mean mass diffusion path length described in the aforesaid incorporated patent. Optimum dimensions are a function of the specific sorbents and refrigerants used in the process, and the operating pressures, approach pressures and temperatures as well as the sorbent loading density and of the substrate material gas permeability. Preferred mean mass diffusion path lengths are below about 15 mm and most preferred are below about 12 mm. The thermal diffusion or thermal path length is dependent on the distance between adjacent heat exchange surfaces, more specifically, the distance from the nearest highly thermally conductive surface to the center of the absorbent mass. For example, for a reactor of the type illustrated in FIG. 7, the thermal path length is one-half of the distance between adjacent fins. Preferably, the thermal path length is less than 4.5 mm, more preferably less than 4 mm and most preferably about 3.0 mm or less. Thus, for finned tube heat exchanger designs, such a thermal path length is equivalent to a reactor fin count of at least four fins per inch of the length (height) of the reactor module. Preferred reactor fin counts are between about 9 and 25 fins per inch (1.4 mm to 0.5 mm thermal path length).

The heat exchanger sorber core may be further improved by use of highly thermal conductive materials such as metals or carbon fibers. The incorporation of such materials or additives in the substrate materials will allow the use of finned tube heat exchangers having a lower fin count or less fins per inch than otherwise disclosed in the aforementioned patents. Thus, substrate fabric or felt may contain, in its woven structure, thermally conductive metal, carbon or graphite fiber or particles. The use of such thermally conductive materials is particularly suitable and even preferable where the substrate material is of relatively low thermal conductivity. For example, glass fiber, known for its low thermal conductivity, will be substantially improved by incorporating such thermally conductive fibers.

Figure 2:
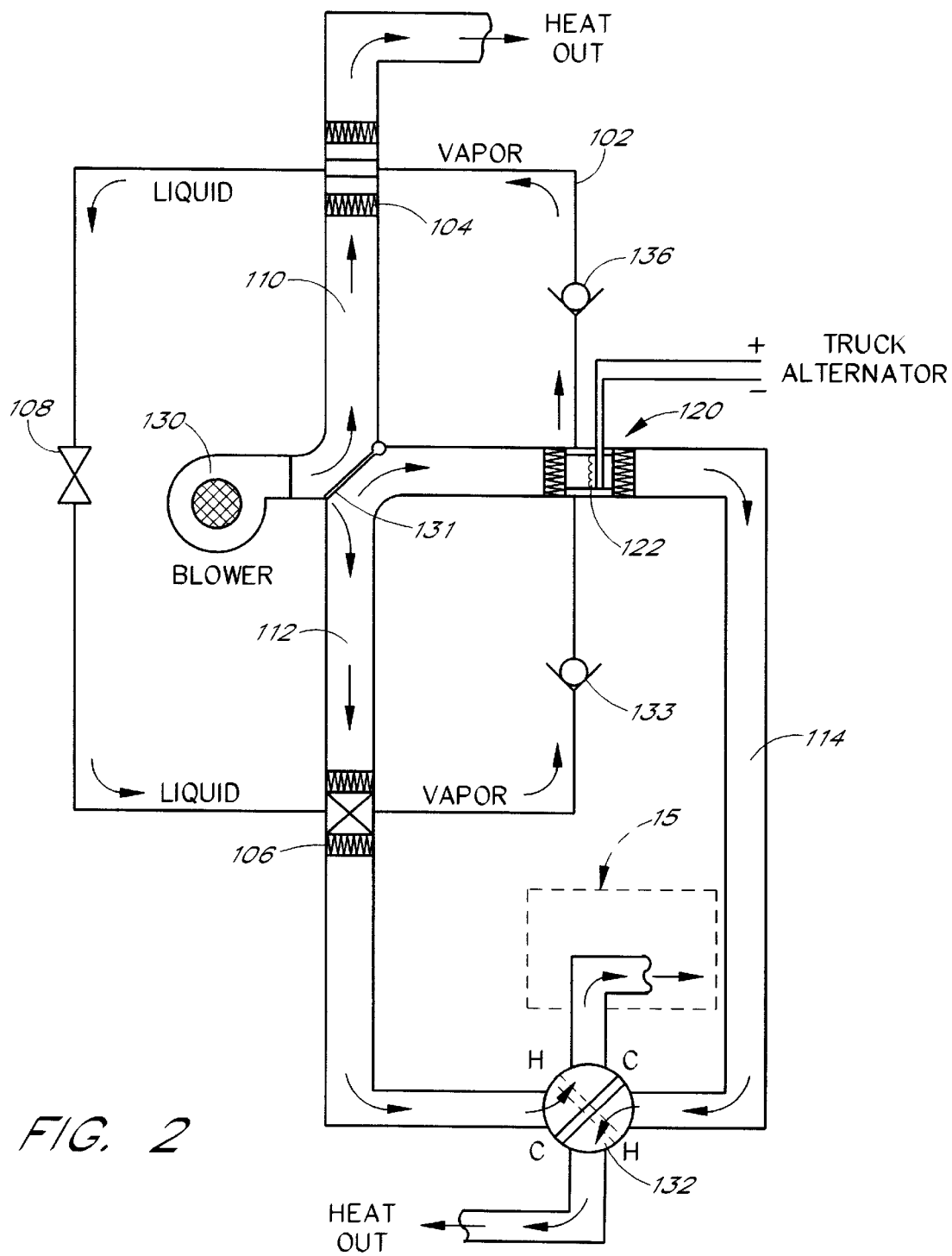
FIG. 2 is a schematic illustration of one embodiment of a one reactor thermal storage-type auxiliary heating and air conditioning system of the present invention.

In FIG. 2 there is illustrated schematically a single reactor heating and air conditioning system embodiment of the invention. In the system, reactor 120 comprises one or more reaction chambers containing one or a mixture of the aforesaid complex compounds which have been formed according to the previously described method. The construction of the reactor including the interior reaction chambers or cores, the relative positioning or location of the fins for achieving the desired thermal and mass diffusion path lengths, fin thickness and shapes as well as the description of the means for directing the refrigerant gas into, through and from the reaction chambers are disclosed in the aforesaid U.S. Pat. Nos. 5,328,671 and 5,298,231 and application Ser. No. 09/304,763 and are incorporated herein by reference. Although a single reactor is shown, a "reactor" may comprise a bank of two or more reactors.

As shown in FIG. 2, a refrigerant circulatory system is provided and includes a refrigerant line 102 disposed in a circuitous path. A refrigerant condenser 104 and evaporator 106 are spaced apart and serially disposed within the circuitous path of the refrigerant line 102. Refrigerant circulated through the refrigerant line is vaporized by the evaporator 106 and subsequently condensed to liquid form by condenser 104. Circulation of the refrigerant is controlled by refrigerant control valve 108.

A blower 130 is provided to circulate air for the auxiliary heating and cooling system. A first air passageway 110 is provided and disposed to intersect the condenser 104. As is known, condensing liquid releases heat energy. Therefore air blown across the coils of the condenser 104 heats the air and thus transfers the heat generated by condenser 104 to the ambient as shown during vehicle operation. A second air passage 112 is disposed to intersect the evaporator 106. Air blown by the blower 130 across the evaporator 106 generates a cool air stream (i.e., heat transferred from air to evaporator 106) downstream of the evaporator 106 during the vehicle resting cycle. A third passage 114 is also provided and is directed for distributing air through the reactor 120. Therefore, air blown by the blower 130 across the reactor 120 heats the air and thus transfers the heat generated by reactor 120 to the atmosphere or ambient during the air conditioning cycle, and to the passenger bunk or sleeping area 15 during the heating cycle via third passage 114. An electric heater element 122 electrically connected to the vehicle alternator may be used to heat the sorbent material within the reactor 120 while the vehicle is operating. However, it will be appreciated that alternative means may be provided to heat the sorbent material. For example, a segment of the engine coolant line may be coiled and disposed within the reactor 120 to heat the material. Alternatively, a segment of the engine oil system may be coiled or otherwise disposed within the sorbent container 120. As the oil heats, along with the engine temperature, it serves to heat the reactor 120. In yet another alternative, a burner may be used, fired by fuel used by the engine of the motor vehicle, such as diesel fuel, gasoline, natural gas, propane or other fuel source as previously described.

As illustrated, the refrigerant line 102 is also passed through the reactor 120. Refrigerant in the vapor state is adsorbed into the solid sorbent material. During the discharge cycle, while the vehicle engine is shut down, desorption (as described above) occurs. A blower control valve 131, refrigerant check valves 136 and 133, and refrigerant control valve 108 are also provided to facilitate the charging and discharge cycles of the illustrated embodiment.

During the charging cycle of the illustrated embodiment, blower control valve 131 is positioned in position 1 as shown. The first check valve 136 is opened and the second check valve 133 and refrigerant control valve 108 are closed. Refrigerant previously adsorbed into the sorbent material is desorbed and passes through the condenser 104 and is liquefied. The output of the blower 130 is directed by blower valve 131 through the first air passage 110 to carry heat from the condenser 104 to the ambient.

During the discharge cycle, blower control valve 131 is disposed in position 2 whereby the airflow from the blower 130 is directed through both passages 112 and 114. The refrigerant control valve 108 and the second check valve 133 are opened and the first check valve 136 is closed. During this stage, the liquid refrigerant passes through the evaporator to change from liquid to vapor state and is delivered to the reactor 120 where it is absorbed. The air delivered through channel 112 is cooled as it passes across evaporator 106. In contrast, the air passing across the reactor is heated. Auxiliary heating and cooling of the passenger bunk or sleeping area 15 is controlled by the air control valve 131. When the control valve 131 is disposed in position C—C as shown, cool air transferring down passage 112 is routed to the passenger area 15 to provide auxiliary cooling while warm air passing down air passage 114 is expelled to the ambient. Conversely, if control valve 131 is disposed in position H—H then warm air channeled down passage 114 is expelled into the passenger area 15 to provide auxiliary heating while the cool air channeled down passage 112 is expelled to the ambient. The system illustrated in FIG. 2 may be modified to incorporate a second blower for recirculating inside air which has already been cooled. The cooled inside air may be mixed with outside air, or recirculated through the system without using any outside air.

Figure 3:
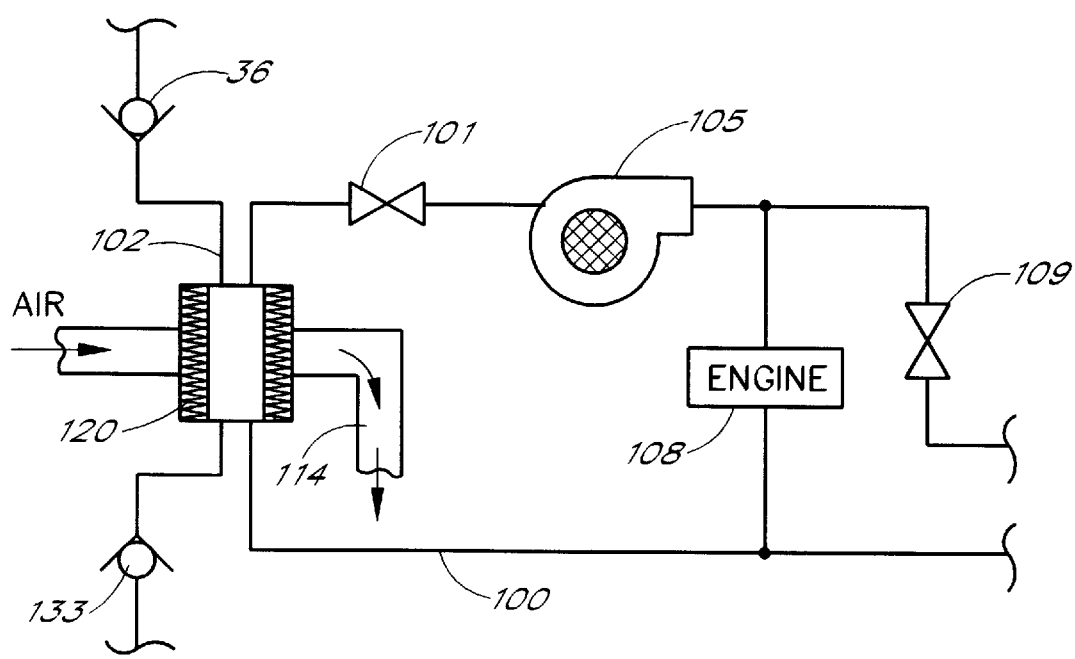
FIG. 3 is a schematic illustration of a portion of the system shown in FIG. 2 for preheating a vehicle engine.

The previously described sorption technology may also be utilized to preheat the vehicle engine in cold weather climates. In this regard, reference is made to FIG. 3, showing a portion of the system described in FIG. 2. More particularly, the reactor 120 may be disposed in connection with a circuitous refrigerant line 102 and air passage 114 as described above. A line 100, however, from the vehicle's coolant system is also disposed in connection with the reactor 120. A flow valve 101 and fluid pump 105 are serially disposed with the coolant line 100 to control the flow of fluid therethrough. As schematically illustrated (and as is known), the coolant line 100 passes through the vehicle engine 108. A second flow valve 109 is also provided to control the fluid flow to other components such as a radiator and heater (not shown).

While the vehicle is running, the sorbent material within the reactor 120 is charged to store thermal energy, as described in connection with FIG. 2. In cold weather climates, after the engine has been shut down for a period of time, it may desired to preheat the engine before starting the vehicle. In this regard, the thermal energy stored in the reactor 120 may be transferred to heat the engine coolant within the coolant line 100. The pump 105 may then circulate the coolant through the engine 108, to preheat the engine before starting.

Figure 4:
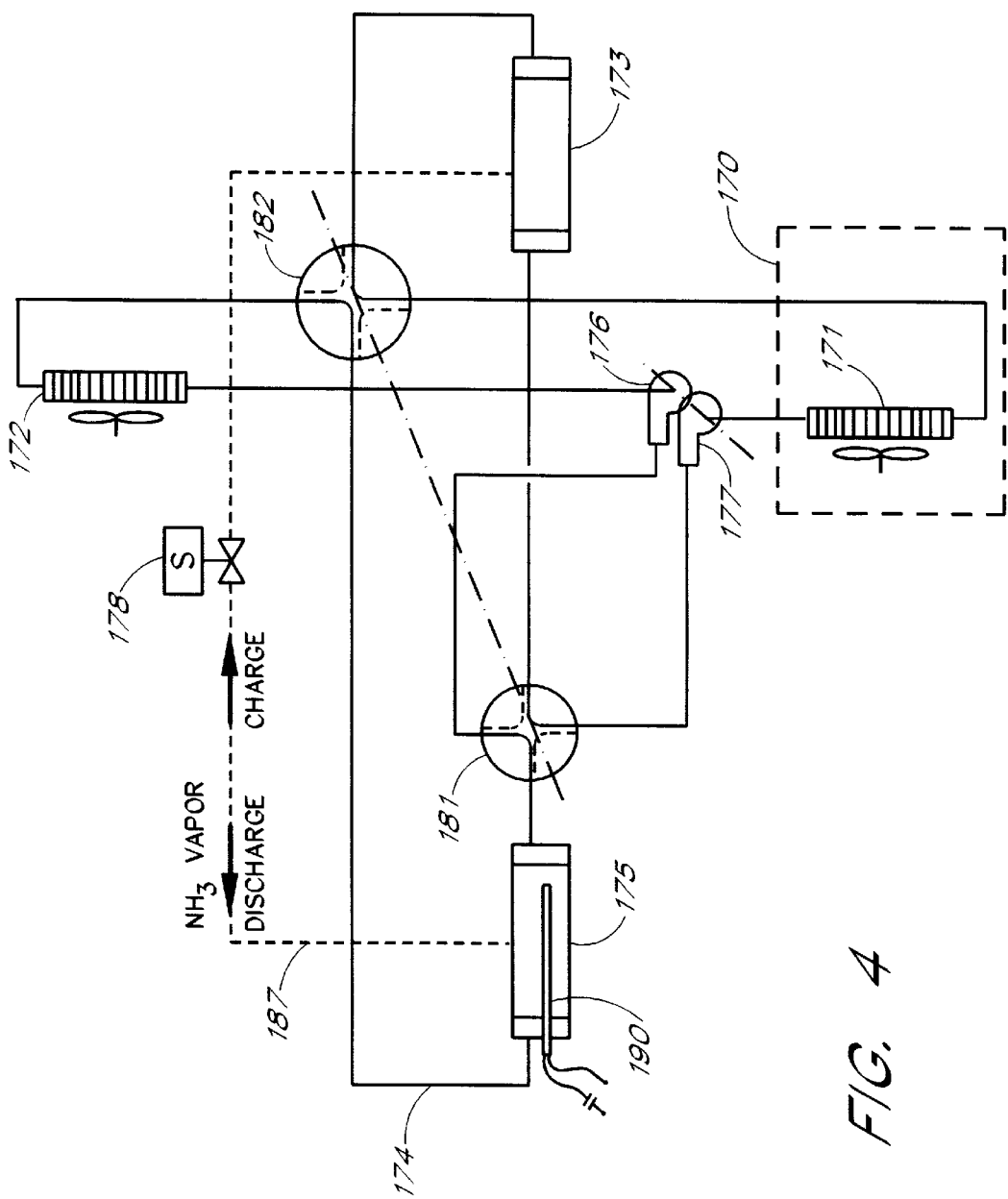
FIG. 4 is a schematic illustration of another embodiment of a one reactor thermal storage-type auxiliary heating and air conditioning system of the present invention.

FIG. 4 is a schematic illustration of yet another embodiment utilizing the aforesaid absorption refrigeration technology for use in heating and cooling of a motor vehicle passenger compartment. In the embodiment illustrated, a single reactor 175 contains a complex compound sorbent as previously described. The reactor comprises one or more reaction chambers containing one or a mixture of the aforesaid complex compounds which have been formed according to the previously described method. The construction of the reactor including the interior reaction chambers or cores, the relative positioning and location of the fins for achieving the desired thermal and mass diffusion path lengths, fin thicknesses and shapes as well as the description of the means for directing the refrigerant gases into, through and from the reaction chambers are as previously described in U.S. Pat. Nos. 5,328,671 and 5,298,231 and application Ser. No. 09/304,763. In the specific single reactor embodiment illustrated in FIG. 4, a thermal storage heater/cooler system is operated as the reactor desorbs ammonia, or other polar gaseous refrigerant, to heat exchanger 173 via refrigerant directing conduit or piping 187. Solenoid valve 178 is selectively operated to allow the refrigerant to pass between the reactor 175 and the heat exchanger 173. The heat exchanger 173 alternately acts as a condenser and an evaporator for the refrigerant, functioning as a condenser during the charging phase as desorbed refrigerant from the reactor is directed to the heat exchanger, where it is condensed. The refrigerant is held in the condensed liquid phase in the heat exchanger, or in a reservoir, not shown, until a cooling function is required. For cooling a passenger compartment, the refrigerant is evaporated in heat exchanger 173 and the vapor is directed back to the reactor 175 at which time it is absorbed on the relatively cool sorbent. Heat exchanger 173 and reactor 175 both include heat transfer sections through which a heat transfer fluid is calculated. Suitable heat transfer fluids include ethylene glycol-water, propylene glycol-water, or equivalent anti-freeze compositions known in the art. The heat transfer fluid exchanges heat with the sorbent in reactor 175 and the refrigerant in heat exchanger 173. An outside coil 172 exchanges heat or thermal energy with the ambient or atmosphere, while the inside coil 171 selectively heats or cools the passenger compartment 170. Each of the inside and outside coils also is provided with a fan or blower, schematically illustrated, which assists in heat exchange of the coils. As previously noted, a "reactor" may comprise a bank of two or more reactors.

The apparatus of the system illustrated in FIG. 4 also includes several control valves such as ganged 4-way valves 181 and 182 and recirculation pumps 176 and 177. The valves and pumps provide the circulation and direction of the heat transfer fluid via the heat transfer fluid piping 174, which communicates with the reactor 175 and evaporator 173, and the inside and outside coils 172 and 171, respectively.

In the embodiment shown, sorbent in reactor 173 is heated by an electric resistive heater element 190 powered by the vehicle alternator as described in the embodiment shown in FIG. 2. Other means for heating the reactor for driving the desorption reaction include heating the complex compound by direct firing of the sorber tubes or using heat from hot gases of combustion from a liquid or gas fueled burner. Alternatively, the sorbent may be heated by hot engine oil or heated coolant from the vehicle cooling system with a heat exchange coil disposed in heat transfer contact with the sorbent in the reactor. The system illustrated may be selectively operated or operated automatically depending on the outside ambient temperature and the selective requirements of heating or cooling the passenger compartment. A microprocessor may be used in cooperation with thermostats which monitor both inside passenger compartment temperatures as well as outside ambient temperature. Thus, such a system can be operated automatically depending on the selected desired temperature within the passenger compartment, and depending on the outside ambient temperature. Heat rejection from heat exchanger 173 when functioning as a condenser is transferred to ambient through the outside coil by circulation of the heat transfer fluid driven by the pumps and reactor 175 is cooled by the heat transfer fluid from the outdoor coil to initiate absorption of the refrigerant on the sorbent. The system may also be used for engine preheating in cold weather conditions using heat rejected from the absorbing reactor 175. At the time of engine preheating, heat exchanger 173 receives heat otherwise supplied by the outside coil through recirculation of the coolant driven by the other of the two pumps.

In order to facilitate the installation, repair, and replacement, any of the heating and air conditioning systems of the present invention can have a modular design. For example, the sorber cooling system shown in FIGS. 2 and 4 may be located in an auxiliary heating and air conditioning module 96 that is mounted on the exterior of the vehicle as shown in FIG. 1. The module 96 is interconnected with the heat exchanger 20 in the passenger compartment 12 via the primary and secondary heat transfer fluid circulatory systems. As also shown in FIG. 1, the module 96 can be substantially in the form of a rectangular enclosure which can be easily mounted to the frame of the tractor-trailer vehicle 10 just behind the sleeper area 15 of the cab. If the system is designed with the characteristics given in the example described above, the system can be contained in a module that is no larger than 5 cubic feet. In addition to the position shown in FIG. 1, the module 96 could also be located just behind the sleeper area 15 on the opposite side of the frame or it could be mounted to the exterior of the rear wall of the passenger compartment 12.

Since the heating and air conditioning system is located primarily outside of the passenger compartment 12 of the vehicle, the system can be accessed for repairs quite easily without having to enter the vehicle or open the engine compartment. The modular design and the exterior location also make it easier to retrofit existing trucks with the system since space does not have to be made within the passenger or engine compartments. Similarly, the modular design of the system makes the system easy to replace with another system when the system must be repaired. Moreover, as opposed to auxiliary heating and air conditioning systems that have significant components connected to the engine, connected to the primary air conditioning system, or located in the engine compartment, the exterior location of the module 96 avoids the possibility of any interference with the normal operation of the vehicle.

What is claimed is:

1. An auxiliary heating and air conditioning system having an output for selectively delivering warm and cool air to the passenger area of a motor vehicle comprising:

a refrigerant circulatory system having a circuitous refrigerant line and an evaporator and condenser serially disposed within the circuitous line operative to vaporize and condense a refrigerant fluid therein, respectively, one or more reactors comprising heat exchange surfaces having space therebetween containing a metal salt or a complex compound formed by absorbing a polar gas refrigerant on a metal salt, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide, said reactor in communication with the refrigerant line for delivering said refrigerant to said reactor for being absorbed and desorbed therein, a heater in thermal communication with said metal salt and said complex compound, and a multi-channel ventilation system having a blower for forcing air through the channels of the system and to the output, said channels communicating with the evaporator, the condenser, and the reactor.

2. A system of claim 1 wherein the reactor has the space between at least a portion of the heat exchange surfaces substantially filled with a sorbent/substrate composition comprising a substrate material inert to said polar gas and incorporating said salt or mixtures of two or more thereof, or said complex compound.

3. A system of claim 2 wherein said substrate material has a porosity of between about 50% and about 98% prior to incorporating said metal salt.

4. A system of claim 2 wherein said substrate material comprises yarn, rope, felt or fabric.

5. A system of claim 3 wherein said substrate material comprises yarn, rope, felt or fabric.

6. A system of claim 2 wherein said metal salt or complex compound comprises at least 50%, by volume, of said sorbent/substrate composition.

7. A system of claim 2 wherein said metal salt or complex compound comprises at least 70%, by volume, of said sorbent/substrate composition.

8. A system of claim 2 wherein said metal salt or complex compound comprises at least 85%, by volume, of said sorbent/substrate composition.

9. A system of claim 3 wherein said substrate material is a woven material.

10. A system of claim 2 in which the polar gas is ammonia.

11. A system of claim 2 in which the polar gas is water, an amine, an alcohol or ammonia.

12. A system of claim 2 in which the salt is a mixture of alkali, alkaline earth, or transition metal salts.

13. A system of claim 2 comprising a finned tube or plate heat exchanger.

14. A system of claim 2 having a mean mass diffusion path length of 15 mm or less.

15. A system of claim 2 having a thermal diffusion path length of 4 mm or less.

16. A system of claim 2 in which the substrate material comprises glass fiber.

17. A system of claim 2 in which the substrate material comprises polyphenylene sulfide.

18. A system of claim 2 in which the substrate material comprises aromatic polyamide or nylon.

19. A system of claim 5 in which the substrate material comprises glass fiber.

20. A system of claim 5 in which the substrate material comprises polyphenylene sulfide.

21. A system of claim 5 in which the substrate material comprises aromatic polyamide or nylon.

22. The system of claim 1 including a blower valve within the multi-channel ventilation system for directing air flow from the blower across the condenser, during a charging cycle.

23. The system of claim 22 wherein the blower valve is operative to direct air flow from the blower across both the evaporator and the reactor during a discharge cycle, wherein the air passing across the reactor is heated and the air passing across the evaporator is cooled.

24. The system of claim 23 including an output valve operative to controllably direct air passing across the reactor to a passenger area of the motor vehicle and to ambient space outside the passenger area.

25. The system of claim 24 wherein the output valve is further operative to controllably direct air passing across the evaporator to the passenger area of the motor vehicle and to ambient space outside the passenger area.

26. The system of claim 1 wherein said heater comprises an electric heater.

27. The system of claim 1 wherein said heater comprises a heating element in fluid communication with the vehicle coolant system.

28. The system of claim 1 wherein said heater comprises a heating element in fluid communication with the vehicle oil system.

29. The system of claim 1 wherein said heater comprises a fuel fired heater.

30. The system of claim 29 wherein the heater is fired by diesel fuel and including a diesel fuel tank for supplying diesel fuel to said heater and to the engine of the motor vehicle.

31. The system of claim 29 wherein the heater is propane fired and includes a propane tank for supplying fuel thereto.

32. The system of claim 29 wherein the heater is gasoline fired and includes a gasoline tank for supplying fuel to said heater and to the engine of the motor vehicle.

33. The system of claim 2 wherein said complex compound is formed by restricting the volumetric expansion thereof during said absorption of said polar gas refrigerant on said metal salt.

34. An auxiliary heating and air conditioning system having an output for selectively delivering warm and cool air to the passenger area of a motor vehicle comprising:

one or more reactors comprising beat exchange surfaces having space therebetween containing a metal salt or a complex compound formed by absorbing a polar gas refrigerant on a metal salt, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide, and a heater in thermal communication with said metal salt and said complex compound, a heat exchanger for selectively operating as a condenser and an evaporator, respectively, a first heat exchange coil in heat transfer communication with the passenger area of a motor vehicle, and a second heat exchange coil for transferring thermal energy outside of the passenger area, first piping communicating with the reactor, the heat exchanger, the first heat exchange coil and the second heat exchange coil for directing heat transfer fluid therebetween, and second piping for directing refrigerant between said reactor and said heat exchanger.

35. A system of claim 34 including one or more pumps cooperating with said first piping for pumping said heat transfer fluid therein.

36. A system of claim 35 including one or more valves cooperating with said first piping for selectively directing said heat transfer fluid between the heat exchanger, the reactor and the first and second heat exchange coils.

37. A system of claim 34 wherein the reactor has the space between at least a portion of the heat exchange surfaces substantially filled with a sorbent/substrate composition comprising a substrate material inert to said polar gas and incorporating said salt or mixtures of two or more thereof, or said complex compound.

38. A system of claim 37 wherein said substrate material has a porosity of between about 50% and about 98% prior to incorporating said metal salt.

39. A system of claim 37 wherein said substrate material comprises yarn, rope, felt or fabric.

40. A system of claim 38 wherein said substrate material comprises yarn, rope, felt or fabric.

41. A system of claim 37 wherein said metal salt or complex compound comprises at least 50%, by volume, of said sorbent/substrate composition.

42. A system of claim 37 wherein said metal salt or complex compound comprises at least 70%, by volume, of said sorbent/substrate composition.

43. A system of claim 37 wherein said metal salt or complex compound comprises at least 85%, by volume, of said sorbent/substrate composition.

44. A system of claim 38 wherein said substrate material is a woven material.

45. A system of claim 37 in which the polar gas is ammonia.

46. A system of claim 37 in which the polar gas is water, an amine, an alcohol or ammonia.

47. A system of claim 37 in which the salt is a mixture of alkali, alkaline earth, or transition metal salts.

48. A system of claim 37 comprising a finned tube or plate heat exchanger.

49. A system of claim 37 having a mean mass diffusion path length of 15 mm or less.

50. A system of claim 37 having a thermal diffusion path length of 4 mm or less.

51. A system of claim 37 in which the substrate material comprises glass fiber.

52. A system of claim 37 in which the substrate material comprises polyphenylene sulfide.

53. A system of claim 37 in which the substrate material comprises aromatic polyamide or nylon.

54. A system of claim 40 in which the substrate material comprises glass fiber.

55. A system of claim 40 in which the substrate material comprises polyphenylene sulfide.

56. A system of claim 40 in which the substrate material comprises aromatic polyamide or nylon.

57. A system of claim 1 including apparatus for preheating the vehicle engine before starting the vehicle comprising:

a coolant line in communication with the reactor and the vehicle engine, a heat exchanger for transferring thermal energy stored in the complex compound to the coolant line, and a fluid pump serially disposed within the coolant line for communicating coolant fluid therethrough, whereby thermal energy transferred from the complex compound to the coolant line is then circulated through the engine to preheat the engine before starting.

58. A system of claim 57 wherein the reactor has the space between at least a portion of the heat exchange surfaces substantially filled with a sorbent/substrate composition comprising a substrate material inert to said polar gas and incorporating said salt or mixtures of two or more thereof, or said complex compound.

59. The system of claim 58 wherein said complex compound is formed by restricting the volumetric expansion thereof during said absorption of said polar gas refrigerant on said metal salt.

60. An auxiliary heating and air conditioning system having an output for selectively delivering warm and cool air to the passenger area of a motor vehicle comprising:

a refrigerant circulatory system having a circuitous refrigerant line and an evaporator and condenser serially disposed within the circuitous line operative to vaporize and condense a refrigerant fluid therein, respectively, one or more reactors comprising heat exchange surfaces having space between at least a portion of the heat exchange surfaces substantially filled with a sorbent/substrate composition comprising a substrate material inert to said polar gas having a metal salt or mixtures of two or more thereof or a complex compound formed by absorbing a polar gas refrigerant on a metal salt, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide embedded or impregnated therein, said reactor in communication with the refrigerant line for delivering said refrigerant to said reactor for being absorbed and desorbed therein, a heater in thermal communication with said metal salt and said complex compound, and a multi-channel ventilation system having a blower for forcing air through the channels of the system and to the output, said channels communicating with the evaporator, the condenser, and the reactor.

61. A system of claim 60 wherein said substrate material has a porosity of between about 50% and about 98% prior to embedding or impregnating said metal salt.

62. A system of claim 60 wherein said substrate material comprises yarn, rope, felt or fabric.

63. A system of claim 60 wherein said metal salt or complex compound comprises at least 50%, by volume, of said sorbent/substrate composition.

64. A system of claim 60 wherein said metal salt or complex compound comprises at least 70%, by volume, of said sorbent/substrate composition.

65. A system of claim 60 wherein said metal salt or complex compound comprises at least 85%, by volume, of said sorbent/substrate composition.

66. A system of claim 61 wherein said substrate material is a woven material.

67. A system of claim 60 in which the polar gas is ammonia.

68. A system of claim 60 in which the polar gas is water, an amine, an alcohol or ammonia.

69. A system of claim 60 in which the salt is a mixture of alkali, alkaline earth, or transition metal salts.

70. A system of claim 60 comprising a finned tube or plate heat exchanger.

71. A system of claim 60 having a mean mass diffusion path length of 15 mm or less.

72. A system of claim 60 having a thermal diffusion path length of 4 mm or less.

73. A system of claim 60 in which the substrate material comprises glass fiber.

74. A system of claim 60 in which the substrate material comprises polyphenylene sulfide.

75. A system of claim 60 in which the substrate material comprises aromatic polyamide or nylon.

76. A system of claim 62 in which the substrate material comprises glass fiber.

77. A system of claim 62 in which the substrate material comprises polyphenylene sulfide.

78. A system of claim 62 in which the substrate material comprises aromatic polyamide or nylon.

79. The system of claim 60 including a blower valve within the multi-channel ventilation system for directing air flow from the blower across the condenser during a charging cycle.

80. The system of claim 79 wherein the blower valve is operative to direct air flow from the blower across both the evaporator and the reactor during a discharge cycle, wherein the air passing across the reactor is heated and the air passing across the evaporator is cooled.

81. The system of claim 80 including an output valve operative to controllably direct air passing across the reactor to a passenger area of the motor vehicle and to ambient space outside the passenger area.

82. The system of claim 81 wherein the output valve is further operative to controllably direct air passing across the evaporator to the passenger area of the motor vehicle and to ambient space outside the passenger area.

83. The system of claim 60 wherein said heater comprises an electric heater.

84. The system of claim 60 wherein said heater comprises a heating element in fluid communication with the vehicle coolant system.

85. The system of claim 60 wherein said heater comprises a heating element in fluid communication with the vehicle oil system.

86. The system of claim 60 wherein said heater comprises a fuel fired heater.

87. The system of claim 86 wherein the heater is fired by diesel fuel and including a diesel fuel tank for supplying diesel fuel to said heater and to the engine of the motor vehicle.

88. The system of claim 86 wherein the heater is propane fired and includes a propane tank for supplying fuel thereto.

89. The system of claim 86 wherein the heater is gasoline fired and includes a gasoline tank for supplying fuel to said heater and to the engine of the motor vehicle.

90. The system of claim 60 wherein said complex compound is formed by restricting the volumetric expansion thereof during said absorption of said polar gas refrigerant on said metal salt.

91. A system of claim 60 including apparatus for preheating the vehicle engine before starting the vehicle comprising:
a coolant line in communication with the reactor and the vehicle engine,
a heat exchanger for transferring thermal energy stored in the complex compound to the segment of the coolant line, and
a fluid pump serially disposed within the coolant line for directing coolant fluid therethrough,
whereby thermal energy transferred from the complex compound to the coolant line is then circulated through the engine to preheat the engine before starting.

92. An auxiliary heating and air conditioning system having an output for selectively delivering warm and cool air to the passenger area of a motor vehicle comprising:
one or more reactors comprising heat exchange surfaces having space between at least a portion of the heat exchange surfaces substantially filled with a sorbent/substrate composition comprising a substrate material inert to said polar gas having a metal salt or mixture of two or more thereof or a complex compound formed by absorbing a polar gas refrigerant on a metal salt, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal halide embedded or impregnated therein, and a heater in thermal communication with said metal salt and said complex compound,
a heat exchanger for selectively operating as a condenser and an evaporator, respectively, a first heat exchange coil in heat transfer communication with the passenger area of a motor vehicle, and a second heat exchange coil for transferring thermal energy outside of the passenger area,
first piping communicating with the reactor, the heat exchanger, the first heat exchange coil and the second heat exchange coil for directing heat transfer fluid therebetween, and
second piping for directing refrigerant between said reactor and said heat exchanger.

93. A system of claim 92 including one or more pumps cooperating with said first piping for pumping said heat transfer fluid therein.

94. A system of claim 93 including one or more valves cooperating with said first piping for selectively directing said heat transfer fluid between the heat exchanger, the reactor and the first and second heat exchange coils.

95. A system of claim 92 wherein said substrate material has a porosity of between about 50% and about 98% prior to embedding or impregnating said metal salt.

96. A system of claim 92 wherein said substrate material comprises yarn, rope, felt or fabric.

97. A system of claim 95 wherein said substrate material comprises yarn, rope, felt or fabric.

98. A system of claim 92 wherein said metal salt or complex compound comprises at least 50%, by volume, of said sorbent/substrate composition.

99. A system of claim 92 wherein said metal salt or complex compound comprises at least 70%, by volume, of said sorbent/substrate composition.

100. A system of claim 92 wherein said metal salt or complex compound comprises at least 85%, by volume, of said sorbent/substrate composition.

101. A system of claim 95 wherein said substrate material is a woven material.

102. A system of claim 92 in which the polar gas is ammonia.

103. A system of claim 92 in which the polar gas is water, an amine, an alcohol or ammonia.

104. A system of claim 92 in which the salt is a mixture of alkali, alkaline earth, or transition metal salts.

105. A system of claim 92 comprising a finned tube or plate heat exchanger.

106. A system of claim 92 having a mean mass diffusion path length of 15 mm or less.

107. A system of claim 92 having a thermal diffusion path length of 4 mm or less.

108. A system of claim 92 in which the substrate material comprises glass fiber.

109. A system of claim 92 in which the substrate material comprises polyphenylene sulfide.

110. A system of claim 92 in which the substrate material comprises aromatic polyamide or nylon.

111. A system of claim 97 in which the substrate material comprises glass fiber.

112. A system of claim 97 in which the substrate material comprises polyphenylene sulfide.

113. A system of claim 97 in which the substrate material comprises aromatic polyamide or nylon.

* * * * *